US011704306B2

(12) United States Patent
Zukowski

(10) Patent No.: US 11,704,306 B2
(45) Date of Patent: Jul. 18, 2023

(54) RESTRICTED VIEWS TO CONTROL INFORMATION ACCESS IN A DATABASE SYSTEM

(71) Applicant: Snowflake Inc., Bozeman, MT (US)

(72) Inventor: Marcin Zukowski, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 225 days.

(21) Appl. No.: 17/150,593

(22) Filed: Jan. 15, 2021

(65) Prior Publication Data

US 2022/0156250 A1 May 19, 2022

Related U.S. Application Data

(60) Provisional application No. 63/114,326, filed on Nov. 16, 2020.

(51) Int. Cl.
*G06F 16/23* (2019.01)
*G06F 16/21* (2019.01)
*G06F 16/2457* (2019.01)
*G06F 21/62* (2013.01)
*G06F 16/242* (2019.01)

(52) U.S. Cl.
CPC ......... *G06F 16/2393* (2019.01); *G06F 16/21* (2019.01); *G06F 16/2445* (2019.01); *G06F 16/24573* (2019.01); *G06F 21/6227* (2013.01)

(58) Field of Classification Search
CPC .. G06F 16/2393; G06F 16/21; G06F 16/2445; G06F 16/24573; G06F 21/6227
See application file for complete search history.

(56) References Cited

U.S. PATENT DOCUMENTS

| | | | | |
|---|---|---|---|---|
| 6,038,563 A | * | 3/2000 | Bapat | ...................... H04L 41/28 707/999.009 |
| 6,405,212 B1 | * | 6/2002 | Samu | .................. G06F 21/6227 707/999.009 |
| 7,243,097 B1 | | 7/2007 | Agrawal et al. | |
| 7,711,750 B1 | | 5/2010 | Dutta et al. | |
| 2003/0058277 A1 | * | 3/2003 | Bowman-Amuah | ....................... G06F 16/289 715/765 |
| 2003/0191768 A1 | * | 10/2003 | Choy | .................. G06F 21/6227 |
| 2004/0044655 A1 | | 3/2004 | Cotner et al. | |
| 2006/0136479 A1 | | 6/2006 | Fan et al. | |
| 2009/0300019 A1 | | 12/2009 | Itkin et al. | |

(Continued)

OTHER PUBLICATIONS

"International Application Serial No. PCT US2021 039763, International Search Report dated Sep. 16, 2021", 2 pgs.

(Continued)

*Primary Examiner* — William Spieler
(74) *Attorney, Agent, or Firm* — Schwegman Lundberg & Woessner, P.A.

(57) ABSTRACT

A restricted view definition is received by a database system. The restricted view definition defines a view over a database table with one or more restrictions on use of the view. The view over the database table is generated based on the restricted view definition. A query directed at the view is received by the database system. The database system determines whether the query directed at the view is permitted based on the one or more restrictions on the use of the view.

30 Claims, 7 Drawing Sheets

(56) References Cited

U.S. PATENT DOCUMENTS

| | | | | |
|---|---|---|---|---|
| 2014/0068718 | A1* | 3/2014 | Mureinik | G06F 16/245 |
| | | | | 726/4 |
| 2020/0042737 | A1* | 2/2020 | Lee | G06F 21/6227 |
| 2020/0311297 | A1* | 10/2020 | Langseth | H04L 9/3242 |
| 2021/0141920 | A1* | 5/2021 | Khurana | G06F 21/31 |
| 2022/0138342 | A1* | 5/2022 | Avanes | G06F 21/6218 |
| | | | | 726/26 |

OTHER PUBLICATIONS

"International Application Serial No. PCT US2021 039763, Written Opinion dated Sep. 16, 2021", 5 pgs.

\* cited by examiner

RESTRICTED VIEWS TO CONTROL INFORMATION ACCESS IN A DATABASE SYSTEM

CROSS-REFERENCE TO RELATED APPLICATION

This application claims priority to U.S. Provisional Patent Application Ser. No. 63/114,326, filed on Nov. 16, 2020, the contents of which are incorporated by reference in their entirety.

TECHNICAL FIELD

Embodiments of the disclosure relate generally to databases and, more specifically, to generating and using restricted views to control access to information in a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
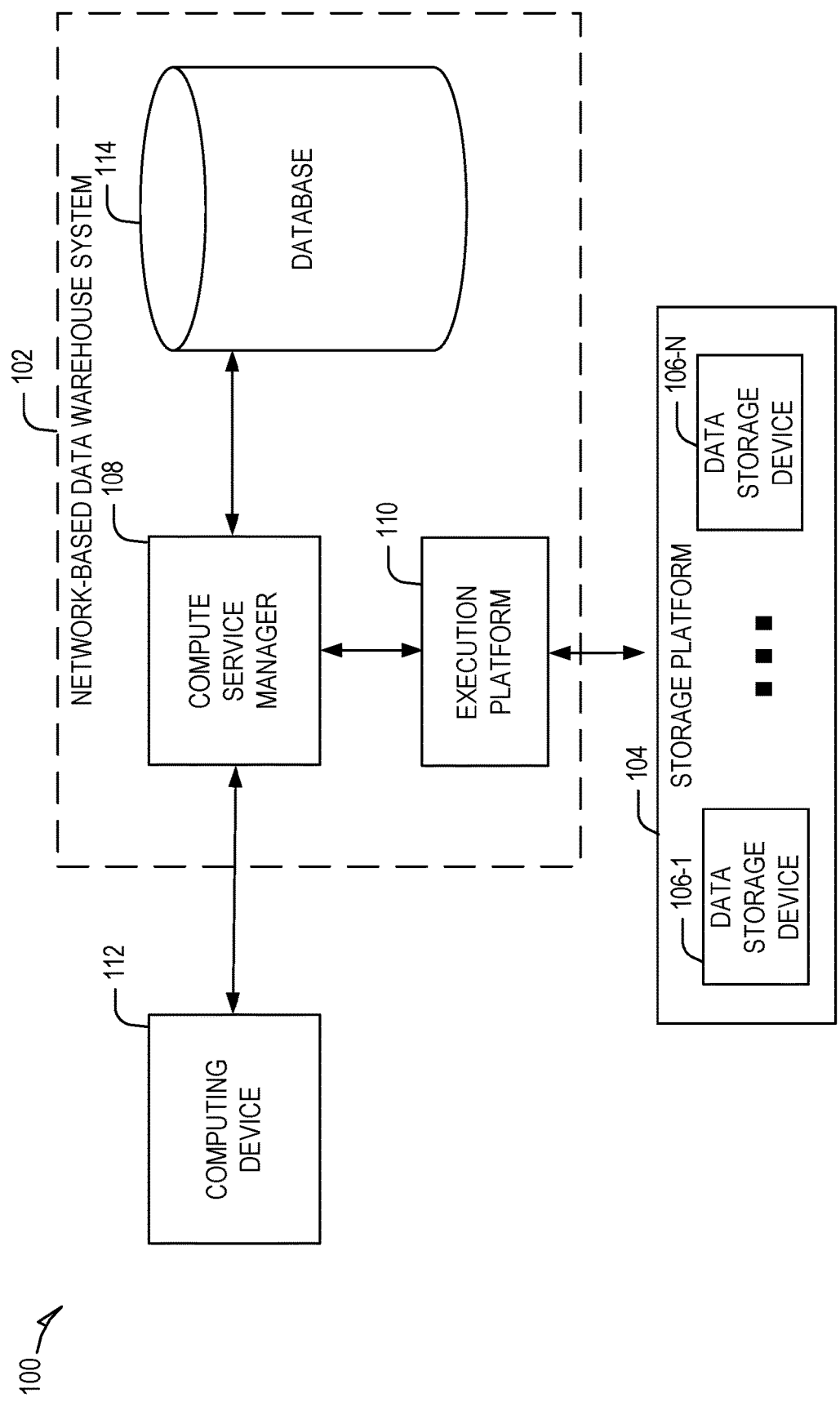
FIG. 1 illustrates an example computing environment that includes a network-based database system in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

When data from a database is shared with others, data owners often desire to provide only limited access to the data for various reasons. As an example, a data owner may want to give others a "sample" of data for free, before charging them for full access. As another example, data owners may want to limit the frequency of data access to a dataset or limit the ability to "extract" the entire provided dataset while maintaining ability to "query" relevant information. As yet another example, database owners may desire to provide aggregate information without exposing details (e.g., for private information protection). It is, however, currently a challenge to provide access to a full dataset so that users can access the full value of the data while protecting data owners from consumers simply copying the full dataset and using it as they want.

Traditionally approaches to this challenge are based on providing a sub-set or a sample of data or providing a predefined set of application programming interfaces (APIs) and queries for data. However, providing a sample or subset limit's the data consumer's ability to access the value of data and meaningfully query the data. The predefined set of APIs and queries can allow full access to data, but only predetermined questions can be answered.

Aspects of the present disclosure address the problems of traditional approaches with a database system that facilitates generation and use of restricted views on database tables. A "view" as used herein comprises a result set of a stored query on a database table or another view. A view behaves as a virtual table that is dynamically computed from data in the table when access to the view is requested. Users of the database system can query a view just as they would a persisted database object. A "restricted" view includes one or more restrictions on use of the view by those who are authorized to access the view. The restrictions applied to a view provide a set of control mechanisms that are based on data owner preferences. As an example, a restricted view can limit the subsets of data that can be consumed in one query, limit the granularity of data that can be visible to the data consumer, limit the amount of information that can be extracted from the underlying data, limit the frequency of access, or limit operations on underlying data.

A restricted view is generated based on a restricted view definition provided by a first user corresponding to a data owner. The restricted view definition defines a view over a table and specifies one or more restrictions on use of the view by other users. The one or more restrictions can be generally applicable to any user authorized to access the view or can be specifically associated with specific users or accounts. The restricted view can be shared with a second user thereby allowing the second user to submit queries directed at the view. The first and second users can be associated with the same customer account or different customer accounts. Upon receiving a query directed at the view from the second user, the database system determines whether the query is allowed based on the one or more restrictions associated with the view. In some instances, the database system can perform at least some processing based on the query to determine whether the query is permitted. If the query is not permitted, the database system returns an error message in response to the query. If the query is permitted, the database system returns the results of processing the query.

FIG. 1 illustrates an example computing environment 100 that includes a database system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 102 and a storage platform 104 (e.g., AWS®, Microsoft Azure Blob Storage®, or Google Cloud Storage®). The database system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the database system 102.

The database system 102 comprises a compute service manager 108, an execution platform 110, and a database 114. The database system 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108. In an example, the compute service manager 108 can allow users to create and share restricted views over data tables. A restricted view is a view that includes one or more restrictions on its use. A restricted view can be created by a first user and shared with a second user. The second user can execute queries against the view in the same manner as a database table. Upon receiving a query directed at a restricted view, the compute service manager 108 checks whether the query is permitted based on any of the restrictions associated with the view. If the query is permitted, results of the query are returned responsive to the query, but if the query is prohibited, an error message is returned responsive to the query.

The compute service manager 108 is also in communication with a computing device 112. The computing device 112 corresponds to a user of one of the multiple client accounts supported by the database system 102. In some embodiments, the compute service manager 108 does not receive any direct communications from the computing device 112 and only receives communications concerning jobs from a queue within the database system 102.

The compute service manager 108 is also coupled to database 114, which is associated with the data stored in the computing environment 100. The database 114 stores data pertaining to various functions and aspects associated with the database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (e.g., Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete database partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the database system 102 based on the changing data storage/retrieval needs as well as the changing needs of the users and systems. The support of dynamic changes allows the database system 102 to scale quickly in response to changing demands on the systems and components within the database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the database system 102. Thus, in the described embodiments, the database system 102 is dynamic and supports regular changes to meet the current data processing needs.

During typical operation, the database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
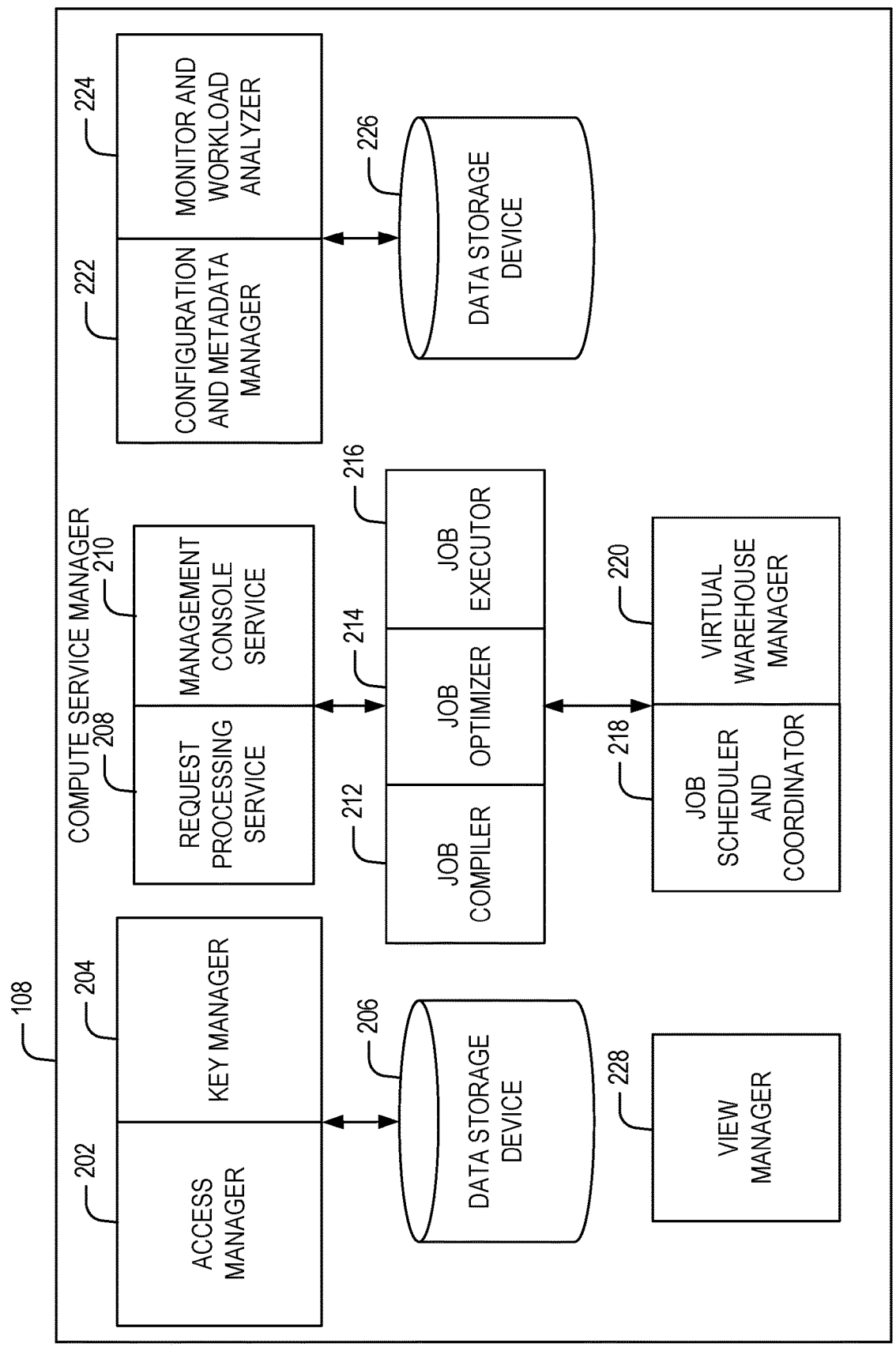
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which partitions need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistribute tasks, as needed, based on changing workloads throughout the database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the database system 102. For example, data storage device 226 may represent caches in execution platform 110, storage devices in storage platform 104, or any other storage device.

The compute service manager 108 also includes a view manager 228 to manage functionality related to generation and use of views. To this end, the compute service manager 108 is responsible for tasks related to generating and sharing views as well as supporting queries on views. For restricted views (views with one or more restrictions), the compute service manager 108 can work in conjunction with the execution platform 110 to determine whether a given query is allowed based on the restricted view, and if so, provide data resulting from executing the query. If the query is not permitted, the view manager 228 provides an error message in response to the query. Further details regarding generation and use of restricted views are discussed below in reference to FIGS. 4-6.

Figure 3:
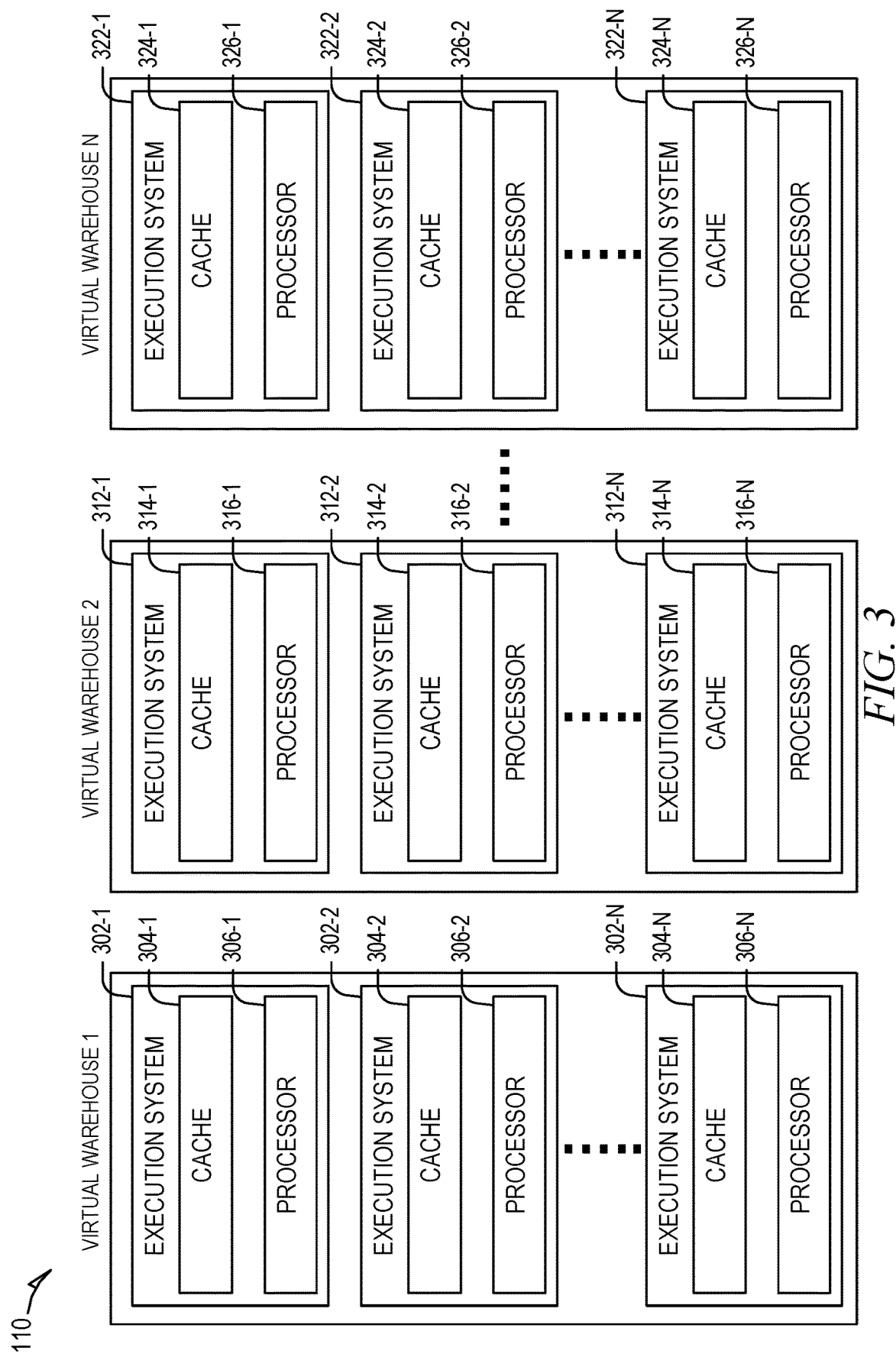
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-$n$ and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-$n$. Execution node 302-1 includes a cache 304-1 and a processor 306-1. Execution node 302-2 includes a cache 304-2 and a processor 306-2. Execution node 302-$n$ includes a cache 304-$n$ and a processor 306-$n$. Each execution node 302-1, 302-2, and 302-$n$ is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-$n$. Execution node 312-1 includes a cache 314-1 and a processor 316-1. Execution node 312-2 includes a cache 314-2 and a processor 316-2. Execution node 312-$n$ includes a cache 314-$n$ and a processor 316-$n$. Additionally, virtual warehouse 3 includes three execution nodes 322-1, 322-2, and 322-$n$. Execution node 322-1 includes a cache 324-1 and a processor 326-1. Execution node 322-2 includes a cache 324-2 and a processor 326-2. Execution node 322-$n$ includes a cache 324-$n$ and a processor 326-$n$.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
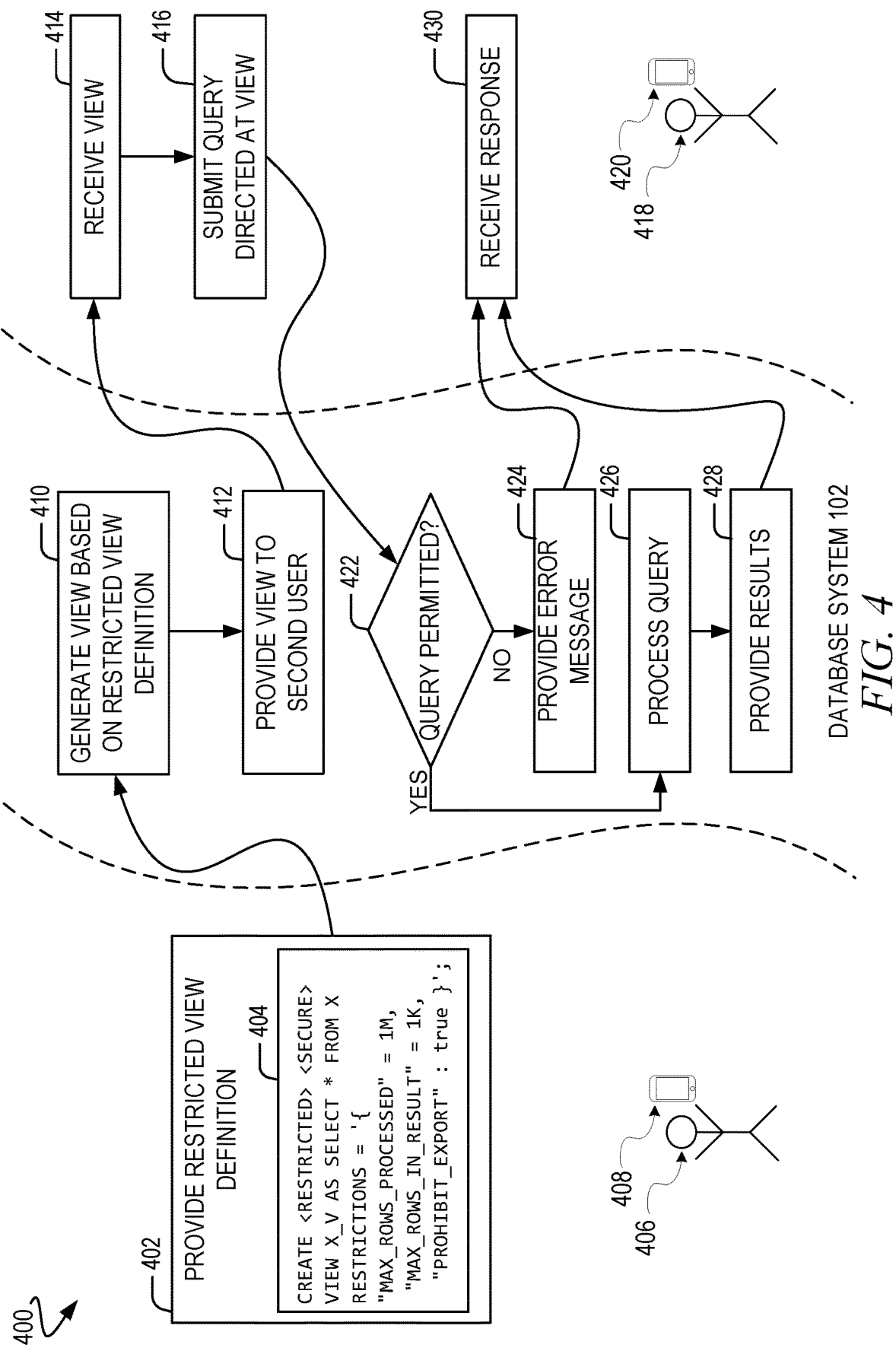
FIG. 4 is an interaction diagram illustrating interactions within the computing environment during a process for generating and using a restricted view of a database table, in accordance with some embodiments of the present disclosure.

FIG. 4 is an interaction diagram illustrating interactions within the computing environment 100 during a process 400 for generating and using a restricted view of a database table, in accordance with some embodiments of the present disclosure.

As shown, the process 400 begins at operation 402 where a user 406 provides a restricted view definition 404 to the database system 102. More specifically, the restricted view definition is created by the user 406 associated using a computing device 408. The user 406 can create the restricted view definition 404 using a command line, user interface, or other input mechanism provided to the computing device. The restricted view definition 404 defines a view over a database table with one or more restrictions on the use of the database table. The restricted view definition 404 includes a query statement that specifies data from the database table along with the one or more restrictions for the view. Multiple classes of restrictions are supported. For example, the restricted view definition 404 can include one or more of metadata-based restrictions (e.g., frequency of access, number of accessed columns) and data-based restrictions (e.g., a number of returned rows or data reduction level). More specifically, the one or more restrictions can place limits on: the subsets of data that can be consumed in a single query, the granularity of data that can be visible, the amount of information that can be extracted from the underlying data, the frequency of access, operations on underlying data (e.g., to prevent private information disclosure), or combinations thereof.

Consistent with some embodiments, the restricted view definition can specify one or more account identifiers corresponding to users or accounts authorized to access the view. The restricted view definition can define restrictions to be broadly applicable to any other user authorized to access the restricted view or can define specific restrictions for specific users or accounts.

As illustrated in FIG. 4, the user 406 can provide a restricted view definition 404 such as the following example code:

```
CREATE <RESTRICTED> <SECURE> VIEW X_V AS
SELECT * FROM X
RESTRICTIONS : '{
    "MAX_ROWS_PROCESSED" :1M,
    "MAX_ROWS_IN_RESULT" :1K,
        "PROHIBIT_EXPORT" : true }';
```

The restricted view definition 404 example referenced above includes three restrictions on a view defined using a select statement (VIEW X_V AS SELECT*FROM X). In particular, the restrictions include: a first restriction that defines a limit on a number of rows that can be processed for a query directed at the view; a second restriction that defines a limit on a number of rows resulting from executing a query on the view; and a third restriction that prohibits data from being exported from the view.

In some instances, rather than defining restrictions using static values, the restricted view definition 404 can define dynamic restrictions based on data from the view or data from another table. As an example, rather than defining a limit on a number of queries using a static value (e.g., "MAX_QUERIES_PER_DAY=1000"), the restricted view definition 404 can dynamically define the limit based on data from the view (e.g., MAX_QUERIES_PER_ DAY= SELECT mqpd FROM restrictions).

At operation 410, the database system 102 generates the view over the database table based on the restricted view definition 404, and at operation 412, the database system 102 provides the view to a user 418. The user 418 may belong to the same account as the user 406, or the users 406 and 418 may belong to different accounts. The user 418 receives the view, at operation 414, and submits a query directed at the view, at operation 416. More specifically, the query is submitted by the user 418 using a computing device 420. The user 418 can submit the query using a command line, user interface, or other input mechanism provided to the computing device 420.

Upon receiving the query, the database system 102, at operation 422, determines whether the query is permitted based on the one or more restrictions on use of the view defined by the restricted view definition 404. As noted above, in some instances, only a sub-set of the restrictions on the use of the view may be associated with the user 418. Accordingly, prior to determining whether the query is permitted, the database system 102 may identify one or more restrictions associated with the user 418. If the query is prohibited based on the one or more restrictions, the database system 102 provides an error message in response to the query, at operation 424. If the query is permitted based on the one or more restrictions, the database system 102 processes the query, at operation 426, and provides the results of processing the query at operation 428.

Depending on the type of restrictions on the view, the database system 102 may perform at least some processing of the query before determining whether the query is permitted. That is, in some instances, the database system 102 can determine that a query is prohibited during or subsequent to execution of the query. In these instances, despite the database system 102 having performed some processing of the query, the database system 102 nonetheless provides an error message in response to the query.

The response to the query (the error message or the results) is received by the user 418, at operation 430. The response to the query can be presented by the computing device 420. For example, the computing device 420 can display the error message or the results of processing the query to the user 418.

Figure 5:
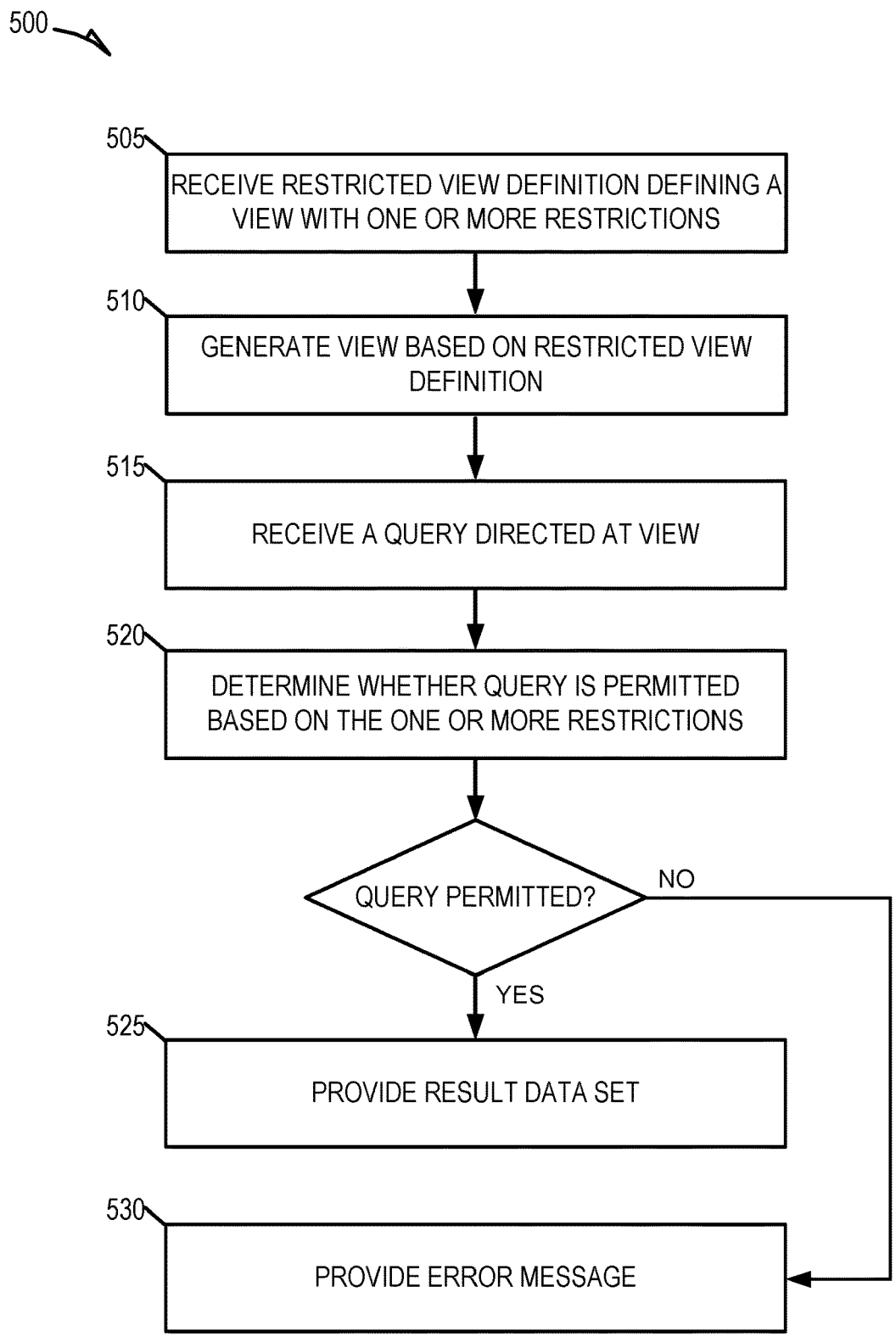
FIGS. 5 and 6 are flow diagrams illustrating operations of the network-based database system in performing a method for generating and using a restricted view of a database table, in accordance with some embodiments of the present disclosure.
Figure 6:
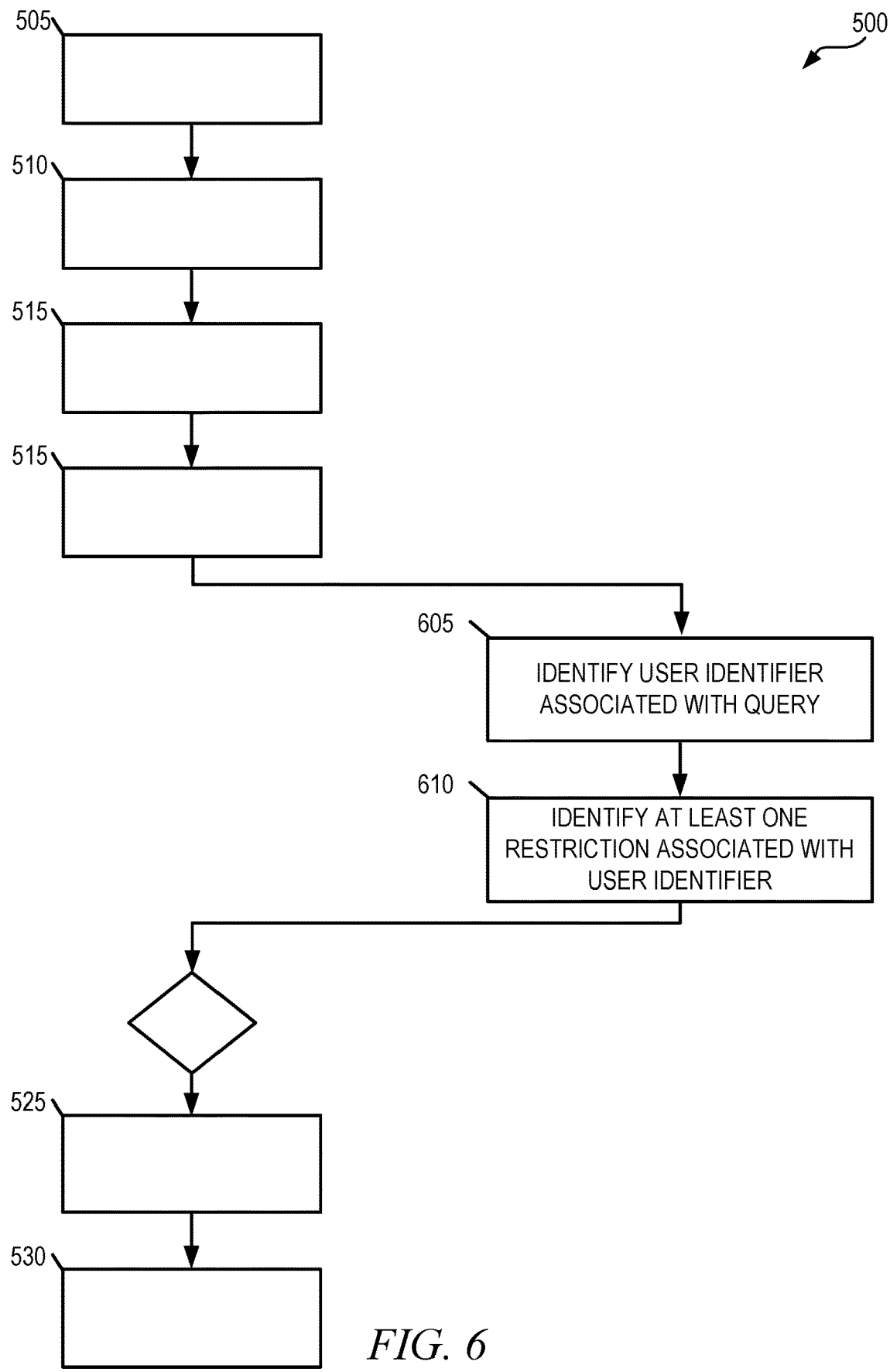

FIGS. 5 and 6 are flow diagrams illustrating operations of the database system 102 in performing a method 500 for generating and using a restricted view of a database table, in accordance with some embodiments of the present disclosure. The method 500 may be embodied in computer-readable instructions for execution by one or more hardware components (e.g., one or more processors) such that the operations of the method 500 may be performed by components of database system 102. Accordingly, the method 500 is described below, by way of example with reference thereto. However, it shall be appreciated that the method 500 may be deployed on various other hardware configurations and is not intended to be limited to deployment within the database system 102.

Depending on the embodiment, an operation of the method 500 may be repeated in different ways or involve intervening operations not shown. Though the operations of the method 500 may be depicted and described in a certain order, the order in which the operations are performed may vary among embodiments, including performing certain operations in parallel or performing sets of operations in separate processes. For example, although the use and generation of the restricted view are described and illustrated together as part of the method 500, it shall be appreciated that the use and generation of the restricted view may be performed as separate processes, consistent with some embodiments.

At operation 505, the compute service manager 108 receives a restricted view definition that defines a view of a database table with one or more restrictions on use of the view. The restricted view definition includes a query statement that specifies data from the database table for inclusion in the view. The one or more restrictions can include metadata-based restrictions or data-based restrictions. More specifically, a restriction can place a limit on: the subset of data that can be consumed in a single query, the granularity of data that can be visible, the amount of information that can be extracted from the underlying data, the frequency of access, operations on underlying data (e.g., to prevent private information disclosure), or combinations thereof. By way of non-limiting example, the one or more restrictions can include: a limit on a number of rows accessed from the view, a limit on a number of rows produced in executing the query, a prohibition on exporting data from the view, a prohibition on joining the view with another view, a prohibition on extracting values from a particular column in the view, a prohibition on column filtering, a limit on a number of columns accessed from the view, a limit on a number of values processed from the view, a minimum data reduction factor, a requirement to include an equality filter, a limit on a range-sizer per query, and a query rate limit.

The restricted view definition is received from a first user (e.g., from a computing device engaged in an active session with the database system 102). Consistent with some embodiments, the restricted view definition can specify one or more user identifiers corresponding to users authorized to access the view. The restricted view definition can define restrictions to be broadly applicable to any other user authorized to access the restricted view or can define specific restrictions for specific users or accounts. For example, the restricted view definition can define a first restriction to be applied to a second user, and a second restriction to be applied to a third user. Furthering this example, the restricted view definition can also specify that the first restriction is to be applied to the second and third user, while the second restriction is only to be applied to the third user.

At operation 510, the compute service manager 108 generates the view based on the restricted view definition. As noted above, the restricted view definition includes a query statement that specifies which data to include in the view. Accordingly, in generating the view, the compute service manager 108 can work in conjunction with the execution platform 110 to execute the query statement to obtain a result data set from the database table.

At operation 515, the compute service manager 108 receives a query directed at the view. The query may specify one or more operations to be performed on the view. The query is received from a second user. In some instances, the first and second user belong to the same account. In other instances, the first user belongs to a first account and the second user belongs to a second account.

At operation 520, the compute service manager 108 determines whether the query is permitted based on the one or more restrictions. As noted above, the compute service manager 108 can support multiple classes of restrictions including metadata-based restrictions (e.g., frequency of access, number of accessed columns) and data-based restrictions (e.g., a number of returned rows or data reduction level). Certain types of data-based restrictions necessitate at least some query processing before the compute service manager 108 can determine whether the query is permitted. Hence, in determining whether the query is permitted, the compute service manager 108 may work with the execution platform 110 to perform at least some processing of the query, depending on the type of restrictions associated with the view. Accordingly, depending on the restrictions on the use of the view, the compute service manager 108 can perform any one or more of the following in determining whether the query is permitted: comparing a number of rows accessed in processing the query to a limit on the number of rows accessed from the view; comparing a number of rows produced in executing the query to a limit on the number of rows produced in executing the query; determining whether the query includes a command to export data from the view; determining whether the query includes a command to join the view with another view; determining whether the query includes a command to extract values from a prohibited column in the view; determining whether the query includes a column filter; comparing a number of columns accessed from the view based on the query with a limit on a number of columns accessed from the view; comparing a number of values processed from the view with a limit on the number of values processed from the view; determining whether the query achieves a minimum data reduction factor; determining whether the query includes an equality filter; comparing a range-size of the query with a limit on a range-size per query; and comparing a query rate of the second user(e.g., a number of queries per day, hour or other unit of time) with a query rate limit.

If the compute service manager 108 determines the query is permitted, the compute service manager 108 works in conjunction with the execution platform 110 to provide a result data set resulting from processing the query, at operation 525. If the compute service manager 108 determines the query is prohibited based on the one or more restrictions, the compute service manager 108 provides an error message responsive to the query, at operation 530. The error message indicates that the query is prohibited. In instances in which at least some query processing is performed to determine whether the query is allowed, the compute service manager 108 will nonetheless provide the error message, rather than any results of the processing, if the compute service manager 108 determines that the query is prohibited.

As noted above, the restricted view definition can define a set of restrictions on use of the view with only a sub-set of the restrictions being applicable to the second user that provides the query. Accordingly, as shown in FIG. 6, the method 500 may, in some embodiments, further include operations 605 and 610, which may be performed prior to operation 520 where the compute service manager 108 determines whether the query is permitted. At operation 605, the compute service manager 108 identifies a user identifier associated with the query and at operation 610, the compute service manager 108 identifies one or more restrictions associated with the user identifier. That is, the compute service manager 108 identifies a user identifier associated with the second user and uses the user identifier to identify restrictions associated with the second user. In an example, a set of restrictions are defined for the view with a first sub-set being associated with the second user and a second sub-set being associated with a third user.

EXAMPLES

Example 1 is a database system comprising: at least one hardware processor; and at least one memory storing instructions that cause the at least one hardware processor to perform operations comprising: receiving a restricted view definition defining a view over a database table, the restricted view definition comprising one or more restrictions on use of the view; generating the view over the database table based on the restricted view definition; receiving a query directed at the view; and determining whether the query directed at the view is permitted based on the one or more restrictions on the use of the view.

Example 2 includes the system of Example 1, wherein the operations further comprise: providing a result data set resulting from processing the query based on determining the query is permitted based on the one or more restrictions on the use of the restricted view.

Example 3 includes the system of any one or more of Examples 1 or 2, wherein the operations further comprise: providing an error message responsive to the query based on determining that the query is prohibited based on the one or more restrictions on the use of the restricted view.

Example 4 includes the system of any one or more of Examples 1-3, wherein the determining whether the query directed at the restricted view is permitted comprises: identifying a user identifier associated with the query; and identifying at least one restriction associated with the user identifier.

Example 5 includes the system of any one or more of Examples 1-4, wherein: the restricted view definition is provided by a first user; and the query is provided by a second user.

Example 6 includes the system of any one or more of Examples 1-5, wherein the operations further comprise: providing the view to the second user.

Example 7 includes the system of any one or more of Examples 1-6, wherein the restricted view definition specifies the second user as being permitted to use the view.

Example 8 includes the system of any one or more of Examples 1-7, wherein the restricted view definition comprises: at least one restriction associated with the second user; and at least one restriction associated with a third user.

Example 9 includes the system of any one or more of Examples 1-8, wherein: the restricted view definition comprises a query statement; and the generating of the view includes executing the query statement to obtain a result data set from the database table.

Example 10 includes the system of any one or more of Examples 1-9, wherein the one or more restrictions comprise at least one of: a limit on a number of rows accessed from the view, a limit on a number of rows produced in executing the query, a prohibition on exporting data from the view, a prohibition on joining the view with another view, a prohibition on extracting values from a particular column in the view, a prohibition on column filtering, a limit on a number of columns accessed from the view, a limit on a number of values processed from the view, a minimum data reduction factor, a requirement to include an equality filter, a limit on a range-sizer per query, and a query rate limit.

Example 11 includes the system of any one or more of Examples 1-10, wherein determining whether the query directed at the view is permitted comprises one or more of: comparing a number of rows accessed in processing the query to a first row limit; comparing a number of rows produced in executing the query to a second row limit; determining whether the query includes a command to export data from the view; determining whether the query includes a command to join the view with another view; determining whether the query includes a command to extract values from a prohibited column in the view; determining whether the query includes a column filter; comparing a number of columns accessed from the view to a first column limit; comparing a number of values processed from the view with a value limit; determining whether the query achieves a minimum data reduction factor; determining whether the query includes an equality filter; comparing a range-size of the query with a range size limit; and comparing a query rate with a query rate limit.

Example 12 is a method comprising: receiving a restricted view definition defining a view over a database table, the restricted view definition comprising one or more restrictions on use of the view; generating the view over the database table based on the restricted view definition; receiving a query directed at the view; and determining whether the query directed at the view is permitted based on the one or more restrictions on the use of the view.

Example 13 includes the method of Example 12 and further comprises: providing a result data set resulting from processing the query based on determining the query is permitted based on the one or more restrictions on the use of the restricted view.

Example 14 includes the method of any one or more of Examples 12 or 13 and further comprises: providing an error message responsive to the query based on determining that the query is prohibited based on the one or more restrictions on the use of the restricted view.

Example 15 includes the method of any one or more of Examples 12-14, wherein the determining whether the query directed at the restricted view is permitted comprises: identifying a user identifier associated with the query; and identifying at least one restriction associated with the user identifier.

Example 16 includes the method of any one or more of Examples 12-15, wherein: the restricted view definition is provided by a first user; and the query is provided by a second user.

Example 17 includes the method of any one or more of Examples 12-16 and further comprises: providing the view to the second user.

Example 18 includes the method of any one or more of Examples 12-17, wherein the restricted view definition specifies the second user as being permitted to use the view.

Example 19 includes the method of any one or more of Examples 12-18, wherein the one or more restrictions comprise at least one of: a limit on a number of rows accessed from the view, a limit on a number of rows produced in executing the query, a prohibition on exporting data from the view, a prohibition on joining the view with another view, a prohibition on extracting values from a particular column in the view, a prohibition on column filtering, a limit on a number of columns accessed from the view, a limit on a number of values processed from the view, a minimum data reduction factor, a requirement to include an equality filter, a limit on a range-sizer per query, and a query rate limit.

Example 20 includes the method of any one or more of Examples 12-19, wherein determining whether the query directed at the view is permitted comprises one or more of: comparing a number of rows accessed in processing the query to a first row limit; comparing a number of rows produced in executing the query to a second row limit; determining whether the query includes a command to export data from the view; determining whether the query includes a command to join the view with another view; determining whether the query includes a command to extract values from a prohibited column in the view; determining whether the query includes a column filter; comparing a number of columns accessed from the view to a first column limit; comparing a number of values processed from the view with a value limit; determining whether the query achieves a minimum data reduction factor; determining whether the query includes an equality filter; comparing a range-size of the query with a range size limit; and comparing a query rate with a query rate limit.

Example 21 is a computer-storage medium comprising instructions that, when executed by one or more processors of a machine, configure the machine to perform operations comprising: receiving a restricted view definition defining a view over a database table, the restricted view definition comprising one or more restrictions on use of the view; generating the view over the database table based on the restricted view definition; receiving a query directed at the view; and determining whether the query directed at the view is permitted based on the one or more restrictions on the use of the view.

Example 22 includes the computer-storage medium of Example 21, wherein the operations further comprise: providing a result data set resulting from processing the query based on determining the query is permitted based on the one or more restrictions on the use of the restricted view.

Example 23 includes the computer-storage medium of any one or more of Examples 21 or 22, wherein the operations further comprise: providing an error message responsive to the query based on determining that the query is prohibited based on the one or more restrictions on the use of the restricted view.

Example 24 includes the computer-storage medium of any one or more of Examples 21-23, wherein the determining whether the query directed at the restricted view is permitted comprises: identifying a user identifier associated with the query; and identifying at least one restriction associated with the user identifier.

Example 25 includes the computer-storage medium of any one or more of Examples 21-24, wherein: the restricted view definition is provided by a first user; and the query is provided by a second user.

Example 26 includes the computer-storage medium of any one or more of Examples 21-25, wherein the operations further comprise: providing the view to the second user.

Example 27 includes the computer-storage medium of any one or more of Examples 21-26, wherein the restricted view definition specifies the second user as being permitted to use the view.

Example 28 includes the computer-storage medium of any one or more of Examples 21-27, wherein the restricted view definition comprises: at least one restriction associated with the second user; and at least one restriction associated with a third user.

Example 29 includes the computer-storage medium of any one or more of Examples 21-28, wherein: the restricted view definition comprises a query statement; and the generating of the view includes executing the query statement to obtain a result data set from the database table.

Example 30 includes the computer-storage medium of any one or more of Examples 21-29, wherein the one or more restrictions comprise at least one of: a limit on a number of rows accessed from the view, a limit on a number of rows produced in executing the query, a prohibition on exporting data from the view, a prohibition on joining the view with another view, a prohibition on extracting values from a particular column in the view, a prohibition on column filtering, a limit on a number of columns accessed from the view, a limit on a number of values processed from the view, a minimum data reduction factor, a requirement to include an equality filter, a limit on a range-sizer per query, and a query rate limit.

Figure 7:
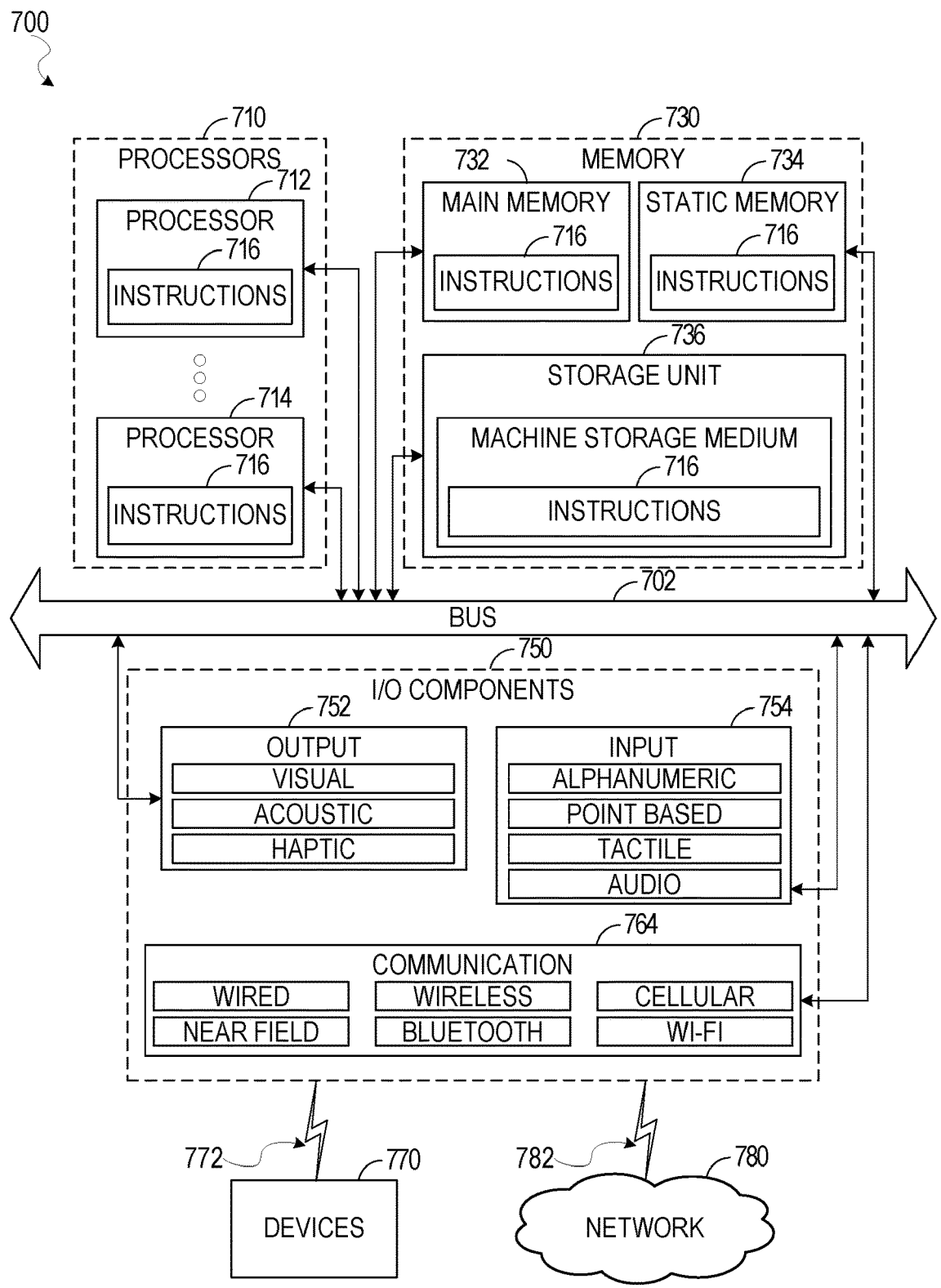
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of the method 500. As another example, the instructions 716 may cause the machine 700 to implement portions of the functionality illustrated in any one or more of FIGS. 4-8. In this way, the instructions 716 transform a general, non-programmed machine into a particular machine 700 (e.g., the compute service manager 108, the execution platform 110, the computing devices 112, 408, and 420 and the data storage devices 206) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108, the execution platform 110, and the devices 770 may include the data storage device 206 or any other computing device described herein as being in communication with the network-based data warehouse system 102 or the storage platform 104.

Executable Instructions and Machine Storage Medium

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
receiving, from a first computing device of a first user, a restricted view definition defining a view over a database table, the restricted view definition specifying one or more restrictions on use of the view, the one or more restrictions specified by the restricted view definition including a first restriction applicable to a second user and a second restriction applicable to a third user;
generating the view over the database table based on the restricted view definition;
receiving, from a second computing device, a query directed at the view;
determining whether the query directed at the view is permitted based on the one or more restrictions on the use of the view specified by the restricted view definition; and
based on determining that the query is prohibited based on the one or more restrictions on the use of the view specified by the restricted view definition, causing display, by the computing device, of an error message responsive to the query.

2. The system of claim 1, wherein:
the query is a first query;
the operations further comprise:
receiving a second query directed at the view;
providing a result data set resulting from processing the second query based on determining the second query is permitted based on the one or more restrictions on the use of the view.

3. The system of claim 1, wherein the error message indicates that the query is prohibited.

4. The system of claim 1, wherein the determining whether the query directed at the view is permitted comprises:
identifying a user identifier associated with the query; and
identifying at least one restriction associated with the user identifier.

5. The system of claim 1, wherein:
the second query is provided by a second user.

6. The system of claim 5, wherein the operations further comprise:
providing the view to the second user.

7. The system of claim 5, wherein the restricted view definition specifies the second user as being permitted to use the view.

8. The system of claim 1, wherein:
the first restriction is applicable to the second user and the third user; and
the second restriction is only applicable to the third user.

9. The system of claim 1, wherein:
the restricted view definition comprises a query statement; and
the generating of the view includes executing the query statement to obtain a result data set from the database table.

10. The system of claim 1, wherein the one or more restrictions comprise at least one of: a limit on a number of rows accessed from the view, a limit on a number of rows produced in executing the query, a prohibition on exporting data from the view, a prohibition on joining the view with another view, a prohibition on extracting values from a particular column in the view, a prohibition on column filtering, a limit on a number of columns accessed from the view, a limit on a number of values processed from the view, a minimum data reduction factor, a requirement to include an equality filter, a limit on a range-sizer per query, and a query rate limit.

11. The system of claim 1, wherein determining whether the query directed at the view is permitted comprises one or more of: comparing a number of rows accessed in processing the query to a first row limit; comparing a number of rows produced in executing the query to a second row limit; determining whether the query includes a command to export data from the view; determining whether the query includes a command to join the view with another view; determining whether the query includes a command to extract values from a prohibited column in the view; determining whether the query includes a column filter; comparing a number of columns accessed from the view to a first column limit; comparing a number of values processed from the view with a value limit; determining whether the query achieves a minimum data reduction factor; determining whether the query includes an equality filter; comparing a range-size of the query with a range size limit; and comparing a query rate with a query rate limit.

12. A method comprising:
receiving, from a first computing device of a first user, a restricted view definition defining a view over a database table, the restricted view definition specifying one or more restrictions on use of the view, the one or more restrictions specified by the restricted view definition including a first restriction applicable to a second user and a second restriction applicable to a third user;
generating the view over the database table based on the restricted view definition;
receiving, from a second computing device, a query directed at the view;
determining whether the query directed at the view is permitted based on the one or more restrictions on the use of the view specified by the restricted view definition; and
based on determining that the query is prohibited based on the one or more restrictions on the use of the view specified by the restricted view definition, causing display, by the computing device, of an error message responsive to the query.

13. The method of claim 12, wherein:
the query is a first query;
the method further comprises :
receiving a second query directed at the view; and
providing a result data set resulting from processing the second query based on determining the second query is permitted based on the one or more restrictions on the use of the view.

14. The method of claim 12,
wherein the error message indicates that the query is prohibited.

15. The method of claim 12, wherein the determining whether the query directed at the view is permitted comprises:
identifying a user identifier associated with the query; and
identifying at least one restriction associated with the user identifier.

16. The method of claim 12, wherein:
the second query is provided by a second user.

17. The method of claim 16, wherein further comprising: providing the view to the second user.

18. The method of claim 16, wherein the restricted view definition specifies the second user as being permitted to use the view.

19. The method of claim 12, wherein the one or more restrictions comprise at least one of: a limit on a number of rows accessed from the view, a limit on a number of rows produced in executing the query, a prohibition on exporting data from the view, a prohibition on joining the view with another view, a prohibition on extracting values from a particular column in the view, a prohibition on column filtering, a limit on a number of columns accessed from the view, a limit on a number of values processed from the view, a minimum data reduction factor, a requirement to include an equality filter, a limit on a range-sizer per query, and a query rate limit.

20. The method of claim 12, wherein determining whether the query directed at the view is permitted comprises one or more of: comparing a number of rows accessed in processing the query to a first row limit; comparing a number of rows produced in executing the query to a second row limit; determining whether the query includes a command to export data from the view; determining whether the query includes a command to join the view with another view; determining whether the query includes a command to extract values from a prohibited column in the view; determining whether the query includes a column filter; comparing a number of columns accessed from the view to a first column limit; comparing a number of values processed from the view with a value limit; determining whether the query achieves a minimum data reduction factor; determining whether the query includes an equality filter; comparing a range-size of the query with a range size limit; and comparing a query rate with a query rate limit.

21. A computer-storage medium comprising instructions that, when executed by one or more processors of a machine, configure the machine to perform operations comprising:
receiving, from a first computing device of a first user, a restricted view definition defining a view over a database table, the restricted view definition specifying one or more restrictions on use of the view, the one or more restrictions specified by the restricted view definition including a first restriction applicable to a second user and a second restriction applicable to a third user;
generating the view over the database table based on the restricted view definition;
receiving, from a second computing device, a query directed at the view; and
determining whether the query directed at the view is permitted based on the one or more restrictions on the use of the view specified by the restricted view definition; and
based on determining that the query is prohibited based on the one or more restrictions on the use of the view specified by the restricted view definition, causing display, by the computing device, of an error message responsive to the query.

22. The computer-storage medium of claim 21, wherein:
the query is a first query; and
the operations further comprise:
receiving a second query directed at the view; and
providing a result data set resulting from processing the second query based on determining the second query is permitted based on the one or more restrictions on the use of the view.

23. The computer-storage medium of claim 21, wherein the error message indicates that the query is prohibited.

24. The computer-storage medium of claim 21, wherein the determining whether the query directed at the view is permitted comprises:
identifying a user identifier associated with the query; and
identifying at least one restriction associated with the user identifier.

25. The computer-storage medium of claim 21, wherein:
the second query is provided by a second user.

26. The computer-storage medium of claim 25, wherein the operations further comprise:
providing the view to the second user.

27. The computer-storage medium of claim 25, wherein the restricted view definition specifies the second user as being permitted to use the view.

28. The computer-storage medium of claim 21, wherein:
the first restriction is applicable to the second user and the third user; and
the second restriction is only applicable to the third user.

29. The computer-storage medium of claim 21, wherein:
the restricted view definition comprises a query statement; and
the generating of the view includes executing the query statement to obtain a result data set from the database table.

30. The computer-storage medium of claim 21, wherein the one or more restrictions comprise at least one of: a limit on a number of rows accessed from the view, a limit on a number of rows produced in executing the query, a prohibition on exporting data from the view, a prohibition on joining the view with another view, a prohibition on extracting values from a particular column in the view, a prohibition on column filtering, a limit on a number of columns accessed from the view, a limit on a number of values processed from the view, a minimum data reduction factor, a requirement to include an equality filter, a limit on a range-sizer per query, and a query rate limit.

* * * * *